United States Patent [19]

Heesch

[11] 4,015,812
[45] Apr. 5, 1977

[54] SEAT ADJUSTMENT MECHANISM

[75] Inventor: Max Otto Heesch, Brooklyn, Mich.

[73] Assignee: International Telephone and Telegraph Corporation, New York, N.Y.

[22] Filed: Oct. 28, 1975

[21] Appl. No.: 626,298

[52] U.S. Cl. ............................... 248/394; 248/373; 248/396
[51] Int. Cl.² ........................................ A45D 19/04
[58] Field of Search .......... 248/393, 394, 396, 373, 248/395, 419

[56] References Cited

UNITED STATES PATENTS

| 2,839,124 | 6/1958 | Desmond et al. | 248/393 |
| 3,319,921 | 5/1967 | Nichols | 248/419 |
| 3,365,163 | 1/1968 | Pickles | 248/394 |
| 3,410,515 | 11/1968 | Posh | 248/394 |
| 3,662,984 | 5/1972 | Robinson et al. | 248/394 |
| 3,669,398 | 6/1972 | Robinson | 248/394 |

*Primary Examiner*—Robert A. Hafer
*Attorney, Agent, or Firm*—J. B. Raden; M. M. Chaban

[57] ABSTRACT

An apparatus for selectively positioning an automotive vehicle seat is disclosed. The apparatus is adapted to be powered by an electric motor drive, such as a motor with multiple armatures or by using separate motors or by using clutch activated members driven by a single motor. Output of the motor drive is transmitted through respective gearing to lead screws within tracking structures at both sides of the seat to translate the seat horizontally. The motor drive output is also transmitted to operate individual lead screws for the vertical seat movements. To provide elevational movement of the front and rear ends of the seat, separate mechanisms from the motor drive to front and rear end lead screws are provided, these mechanisms being distributed along the seat width. These lead screws cause rotation of respective individual torsion bars at the respective front and rear ends of the seat. By the construction shown, rotation of a torsion bar raises or lowers the respective seat end.

12 Claims, 5 Drawing Figures

SEAT ADJUSTMENT MECHANISM

BACKGROUND OF THE INVENTION

Apparatus for the powered adjustment or position setting of automotive seats are extremely well-known in the art. The power in many cases is supplied either by separate reversible motors, one for each movement or by clutch mechanisms driven by a single reversible motor. More recently, a single, reversible motor with plural individually selectable armatures has been used to provide the power. The apparatus of the present invention may be powered by any of the cited drive motor arrangements. For any such apparatus, external suitably located control switches or the like selectably control the operation of the motor or motors (and clutch, if provided) produce forward or reverse horizontal movement of the seat, and independent raising or lowering of the front and rear ends of the seat.

To provide the drive from the motor or motors to the output mechanisms, various types of mechanical mechanisms and linkages have been used. Most recently, these mechanisms have used drive cable members operated by the respective motors to rotate gear trains. For example, in U.S. Pat. No. 3,437,303 to J. Pickles dated 4/8/69, a rack and pinion mechanism is driven by flexible cable members to produce the horizontal movement. Worm and threaded shaft engagement are frequently used to produce both vertical movements from the respective drive members. Other patents such as U.S. Pat. No. 2,961,032 issued 11/22/60 to Ferro Mfg. disclose similar structures.

SUMMARY OF THE INVENTION

The present invention provides three types of seat motion: vertical movement of the front edge of the seat, vertical movement of the rear edge of the seat, and horizontal translatory movement of the seat. These movements are all generated by lead screw mechanisms individually driven by motor mechanisms of any generally known conventional type.

Both vertical movements are produced by separate lead screws rotated by individual worm gears. Each lead screw travels within a threaded tubular member, the member being pivotally secured to one end of a link, the other end of the link being secured to a torsion bar rotated responsive to the lead screw movement. An arm on the torsion bar rotates with the bar to move the seat support accordingly.

Lead screws used to produce the horizontal movement are located above and parallel to the respective tracks. For the vertical movements, the lead screws are located between the motor mechanism and the side track members, the lead screws and their drive gear boxes being mounted on platforms forming an integral part of the structural cross-bracing of the mechanism.

It is therefore an object of the invention to provide an improved power driven, six-way seat track apparatus in which the movements are generated by four lead screw and threaded drive engagements.

It is a further object of the invention to provide a powered seat track structure for a vehicle with powered, longitudinal, horizontal movement being generated by lead screws driving threaded member within a horizontal track at the lateral edges of the seat with vertical individual drive structure for the front and rear being spaced between the tracks and adjacent the motor mechanism.

It is a further object of the invention to provide a powered seat apparatus in which individual front and rear torsion bars are rotated to provide the output vertical movement.

It is a still further object of the invention to provide powered seat apparatus for a vehicle using essentially identical power transferring members to produce horizontal movement of the seat track, and individual, transversely-spaced drive members acting on respective torsion bars to elevate and lower the respective seat ends.

Other objects, features and advantages of the invention will become apparent from the following specification viewed in conjunction with the drawings which are described briefly next.

DETAILED DESCRIPTION OF THE DRAWINGS

Figure 1:
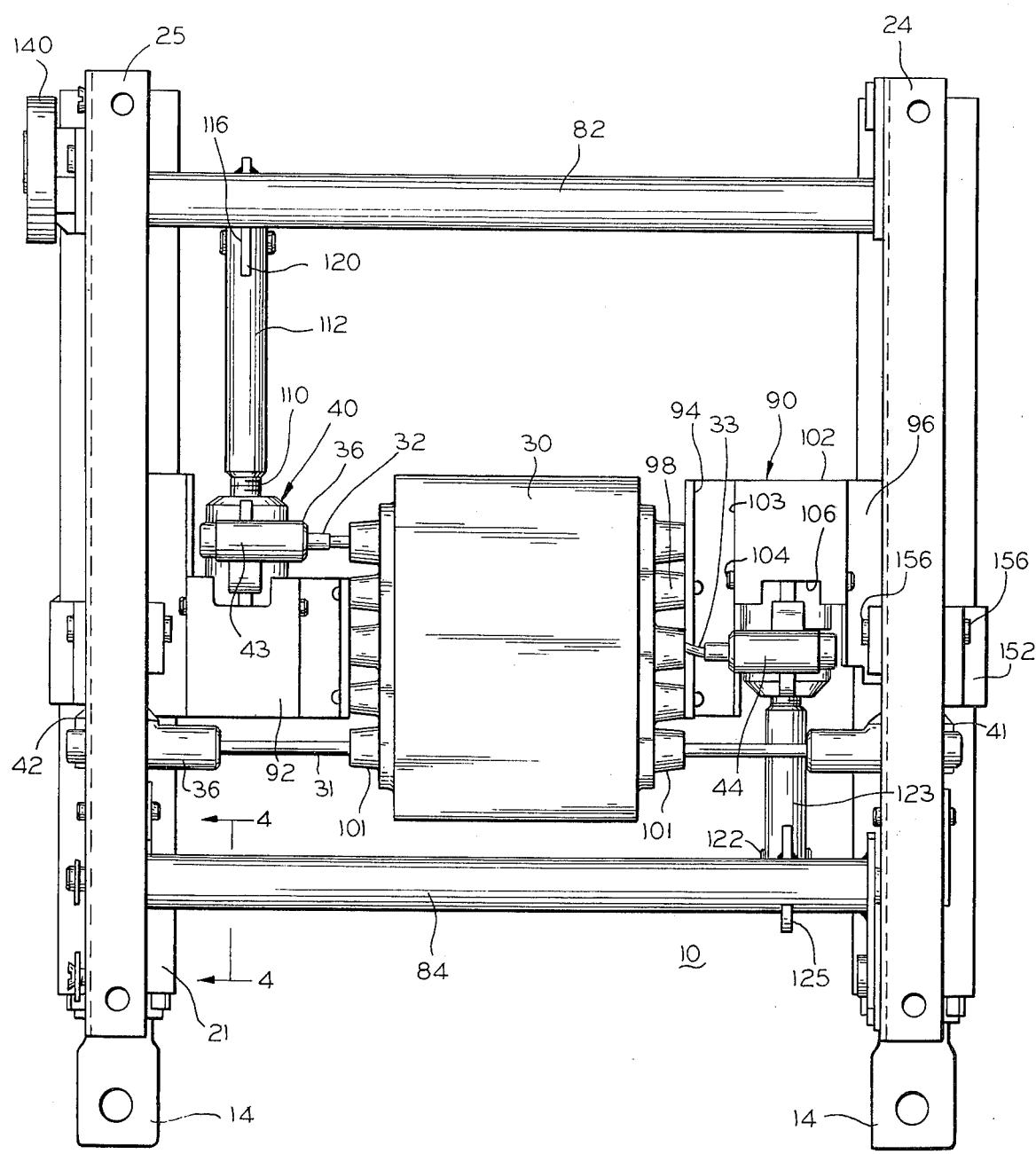
FIG. 1 is a plan view of an apparatus viewed from the front thereof employing a preferred embodiment of my invention.
Figure 2:
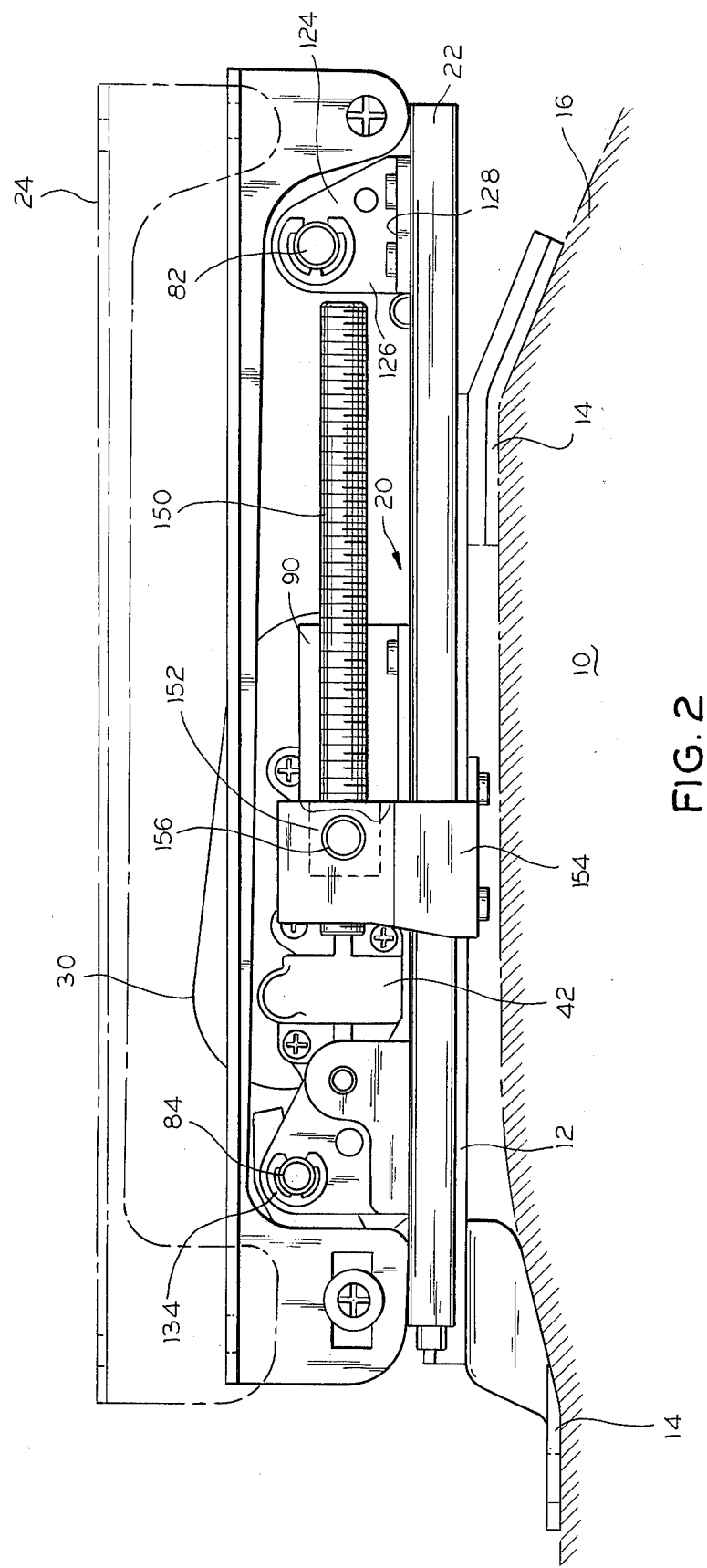
FIG. 2 is a side elevational view of the apparatus of FIG. 1.
Figure 3:
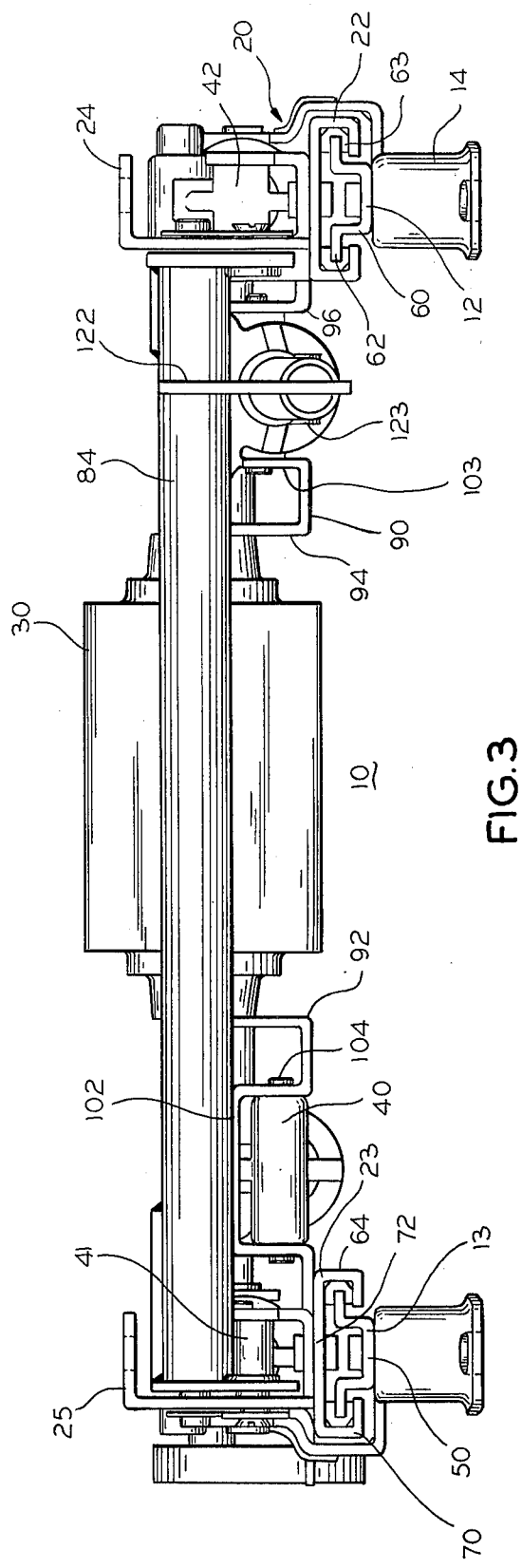
FIG. 3 is an end view of the apparatus of FIG. 1 viewed from the front thereof.

In FIGS. 1-3, I show an apparatus 10 employing a preferred embodiment of my invention. The apparatus has two transversely-spaced generally U-shaped structural mounting base rails 12 and 13, each of which is suitably affixed by bolts or the like to front and rear respective beams or brackets 14, the beams being secured permanently to the floor 16 of the vehicle. The two base rails 12 and 13 are parallel to one another and are spaced a lateral distance from one another to receive and support a vehicle seat on the two rails.

The major structural elements of the apparatus 10 are the respective mounting base rails 12 and 13, each of which is affixed to the stationary floor structure of the vehicle; and a longitudinally translatable carriage 20 which is secured to the seat. The carriage is generally comprised of two spaced-apart tracks 22 and 23, each being engaged with a like base rail 12 and 13 in a tracked relationship allowing horizontal front to rear movement. Seat securing brackets 24 and 25 rest above each track of the apparatus and are secured to the carriage at the front and rear of each track 22 and 23. The brackets are pivoted at their both longitudinal ends to the carriage, and carry a seat by connection at the front and rear seat ends. Controlled drive, translatory motion of the carriage 20 produces longitudinal movement of the seat in a fore and aft sense in response to selection at devices (not shown). Movements within the carriage of the front and rear controlled drive produce selective vertical movement of either the front or the rear end of the seat securing brackets 24 and 25 and consequent movement of the front or rear end of the seat respectively. Brackets 24 and 25 are generally conventional, each secured above and generally coextensive with a rail and its engaged track.

In FIGS. 1-3, I show as a drive for the apparatus a three-armature motor 30 of a type well-known in the art. The motor has a rigid housing or casing with suitable end bell structure enclosing three output drive shafts 31, 32 and 33, supported intermediately in the apparatus 10 between the mounting base rails. Suitable other motor-controlled drives such as a single motor with three individually selectable clutch drive shafts or three separate motors mounted (in parallel with one another) could also be used. In any event, there would be an output shaft from each motor-controlled drive. The three output shafts 31, 32 and 33 of the motor drives are connected to respective driven assemblies of the apparatus.

The motor drive output armature or shafts 31, 32 and 33 each are engaged to and rotate an internal drive within an enclosing flexible tube, the cable and tube being of known design, the cable within a tube herein being generally called a shaft. The internal cable for each shaft may in any conventional manner rotate a suitable driven gear (not shown) within the enclosing socket 36 of a respective one of the gear boxes 40, the gear boxes being of the type shown in my co-pending application, Ser. No. 452,687 filed Mar. 20, 1974. Four such gear boxes or transmisions are provided, two being driven by one motor shaft as shown in FIG. 1 by the drive at tubes at each lateral end of the motor. The gear boxes of the drive assemblies called the left track horizontal gear box 41, right track horizontal gear box 42, rear vertical gear box 43 and front vertical gear box 44 herein are essentially identical in internal construction and operation. The engagement of each shaft cable with the driven shaft within socket 36 is disengageable as is well-known in the art in any manner which permits component replacement and the like.

Mounting base rail 12 of the apparatus is a unitary, rigid structural member having a generally U-shaped cross section with stepped, outwardly extending flanges. The web 50 of the base rail is supported by the apparatus mounting brackets at both the front and the rear, the central section being raised between the feet as shown most clearly in FIG. 2. Suitable apertures or mounting holes (not shown) in the brackets 14 allow the base rails 12 to be mounted to suitable floor support structure of the vehicle.

The sides 60 of the U-shape of the mounting base rail (shown best in FIG. 3) are parallel and terminate in outwardly facing horizontal flange members 62. Suitable plastic guides 63 are mounted and may be adhered to these flange members to provide a continuous sliding medium between the flange members 62 of rail 12, and the inwardly open channel slide track members 64 within which these flange members of track 22 are tracked. The slide track members 64 form one lower extremity of the translatable sliding carriage 20. The track members 64 essentially comprise a unitary beam formed by two C-section tracks 70 joined together structurally by a horizontal wall 72. The horizontal drive assemblies are secured on the carriage horizontal wall 72 in the area above the respective base rail members.

As seen best in FIG. 1, the carriage 20 includes structure mounted on two transversely spaced-apart slide tracks 22 and 23 movable jointly along the stationary rails 12 and 13 in a fore and aft or front to rear sense. Structurally, the carriage includes a transverse platform structure affixing the motor 30 midway between the tracks 22 and 23. A rear torsion bar 82 and a front torsion bar are each laterally disposed between tracks 22 and 23. The bars are each mounted to the tracks 22 and 23 to span the space between the tracks at the respective front and rear of the carriage. Pivotally linked to the torsion bars are seat securing brackets 24 and 25 which are positioned above the respective tracks.

The motor 30 is rigidly secured with its axes disposed laterally of the apparatus between the tracks 70 of the carriage by means of two platforms 90 and 92. Both platforms have essentially identical cross-section, each having two side channel sections 94 and 96 for mounting respectively to the motor and to the track sidewall. These platforms provide a rigid mounting for the motor and provide structural rigidity for the entire apparatus by spanning the space between the respective left side track and right side track to join the motor to the carriage tracks. In addition, the structural rigidity of the motor casing is used to stabilize the mechanism. Platform 90 mounts at one end to the motor by engaging at one end raised bosses 98 extending transversely from the motor end caps between the shaft sockets 101. Platform 90 is secured at its other end to the carriage structure. In like fashion, platform 92 mounts between the other end of motor casing structure and the adjacent track.

These platforms 90 and 92 also act as the mounting support for the gear boxes 43 and 44 for the rear and front drives. As seen best in FIGS. 1 and 3, the platforms have a central inverted U-shaped portion 102 providing vertical sidewalls 103 to which the gear boxes are firmly riveted or pinned at both transverse sides by pivot pins 104. Each of the platforms has a recess 106 at one end to accommodate the respective gear box. As seen best in FIG. 1, the right side gear box 44 is positioned at the front of the platform, and box 43 at the rear of the platform, both boxes having their input axis substantially alignable with the respective motor output shaft.

The rear drive gear box 43 has extending rearwardly therefrom, a drive screw 110. This drive screw is rotated responsive to rotation of motor shaft 32 in known fashion. An internally threaded tube 112 or nut member receives the free end of lead scew 110, and is advanced or retracted in response to rotation of the lead or drive screw. At its rearward end, tube 112 has a central axial slot 116. This slot provides a clearance opening within which there is pivotally fitted a link 120, the line being pinned pivotally diametrally to the tube at pin 122 seen best in FIG. 5. The link 120 is mounted pivotally so that the lower end of the link is advanced or retracted responsive to rotation of the lead screw. At its other end, the link 120 is firmly affixed as by welding or the like, to the outside of torsion bar 82 extending substantially radially therefrom. Thus on rotation of the lead screw 110, link 120 is rotated to rotate torsion bar 82. In a similar manner, front torsion bar 84 is secured to be responsive to rotation of lead screw output of its gear box 44, through tube 123 and link 125.

Each of the torsion bars 82 and 84 is secured in place by front and rear L-shaped brackets 124. Each L-shaped bracket has an upright 126, which supports the respective lateral end of the torsion bar and a horizontal or bottom foot section. A bottom foot section 128 of each bracket 124 is suitably affixed by bolts, pins or rivets 130 of the horizontal wall 72 of the respective sliding tracks 22 and 23. Suitable C-rings 134 rest within notches in the respective transverse ends of each torsion bar outwardly of the brackets 124 to hold the torsion bars firmly in place relative to the carriage.

The rear torsion bar may have an extension on one side, the left side as shown in FIG. 1, bearing a counter balance spring 140. As is generally known, a flat or ribbon torsion spring configured into a spiral path may have an inner tang end which rests within a suitable end slot in the torsion bar to provide counterbalance to the weight of the seat and a person sitting on the seat.

Each torsion bar 82 and 84 has secured to it by suitable means such as welding, a pair of links 144, one such link at each transverse end of a bar. The paired links of a bar are rotated by rotation of the respective torsion bar. The free end of each link is pivotally secured to one end of the adjacent seat support bracket. The paired links provide a pair of levers secured to and movable with a respective torsion bar for raising and lowering one end of both seat securing brackets 24 and 25.

Figure 5:
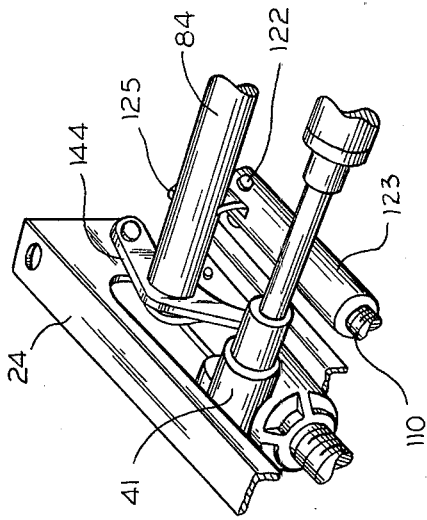
FIG. 5 is a partial view in perspective of the right front corner of the apparatus of FIG. 1.

An extension 147 of each link 144, as shown best in FIG. 5, is provided to engage a stationary pin 148 extending inwardly from upright 126 to limit the travel of the seat support bracket in the up direction. A travel stop in the lowering direction is provided by the engagement of the seat support bracket with the stationary housing structure.

As mentioned previously, there is provided one gear box 43 and its resultant drive structure for the rear torsion bar 82. A gear box 44 and similar drive structure is provided for front torsion bar 84.

A single drive link 120 or 125 from gear box 43 or 44 is provided to drive each torsion bar and paired link arms 144—one at each transverse end are used to raise or lower the like end of seat support brackets at the same time. A similar structure is provided for both front and rear drives as mentioned. The torsion bars are secured to the respective carriage brackets at each side of the seat to add to the structural rigidity of the carriage by virtue of their connection at both transverse ends to the carriage structure.

To provide the horizontal drive of the carriage, opposed end output shafts 31 of the motor 30 are provided on both transverse sides for connection within respective gear boxes 41 and 42 to the respective left and right side track structures. Each of the gear boxes 41 and 42 has as its output a generally horizontal lead screw 150, the right side unit being shown best in FIG. 2. A suitable internally threaded member such as nut 152, is firmly secured to the stationary rail 12 by means of a support bracket 154 to receive the screw. The bracket 154 has an inverted U-shaped structure to secure the nut on both sides by pins or rivets 156. The drive or lead screw 150 is advanced or retracted by the gear box transmission responsive to motor drive as the screw passes through the stationarily mounted nut 152. Since the gear boxes 41 and 42 are firmly secured to the carriage structure, the carriage structure is translated horizontally in a fore and aft sense relative to the stationary nuts 152 on both sides to drive the carriage accordingly. This horizontal drive structure is generally similar to that shown in my earlier application, Ser. No. 452,687, filed Mar. 20, 1974.

Figure 4:
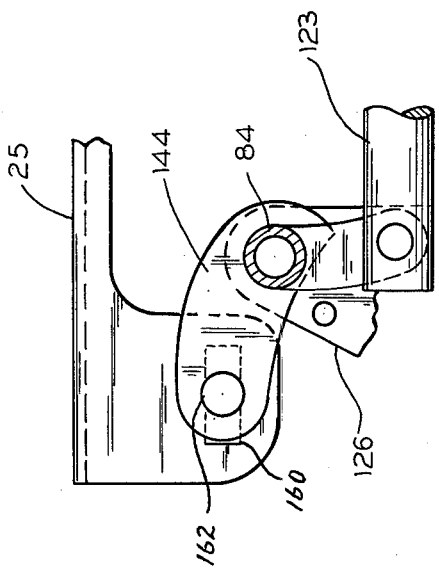
FIG. 4 is a section taken along line 4—4 of FIG. 1.

A lost motion connection is provided in the pivotal mounting between the link arms 144 and one end of the seat support bracket. This connection shown best in FIG. 4, at the front end of bracket 25 is provided by a horizontal slot 160 in the front end of the seat support bracket in which the front torsion bar link 144 at one lateral side is pivotally pinned by pin 162. This lost motion connection allows the rotary motion of the link arms to be connected into essentially vertical motion of the respective seat ends.

All seat track apparatus designed for use in the automotive industry must meet certain governmental and industry standards. These include test load in pounds which must be supported by the various parts of the seat, limits on the speed of operation of the drives, and maximum movements allowable. In addition, a seat support should meet federal restraint standards under impact conditions, and various push and pull forces when in its weakest or all-the-way-up position. The apparatus as described herein meets the presently applied standards fully.

By the structure disclosed, I provide a seat track apparatus, especially usable for bucket seat or partial seats. The apparatus uses a single gear box for upward and downward movement of the seat rear end through a rear torsion bar, and a second gear box for raising and lowering the front end through the use of a second torsion bar. The apparatus uses individual drive systems in each side track for providing front-to-rear movement. The apparatus is a structurally rigid one by virtue of a platform secured between the motor casing and the adjacent carriage side, two such platforms being used. These platforms also act to support and position the respective vertical drive gear boxes. By combining mounting platforms with the structural rigidity of the motor casing, rigidity and stability of the carriage is produced. In addition, the torsion bars at the front and rear ends of the mechanism provide a further degree of structural rigidity and stability.

While there has been shown what is at present considered to be a preferred embodiment of the invention, it is understood that modifications may be made therein and it is intended to cover in the appended claims, all such modifications which fall within the true spirit and scope of the invention.

I claim:

1. A six-way power seat track for a vehicle comprising a pair of parallel rail members laterally spaced apart, a carriage tracked to said rail members and including a pair of track members with each track member individually engaging one of said rail members and constraining said carriage to movement substantially in a fore and aft sense, means interfacing between said track and rail members for causing movement of said carriage in said fore and aft sense, drive motor means, a pair of seat support brackets, for carrying respective sides of a seat, a first mechanism driven by said motor means for elevating the front end of a seat mounted on said seat support brackets, a second mechanism driven by said motor means for elevating the rear end of both of said seat support brackets, each of seat end elevating mechanisms including a torsion bar mounted on said carriage at an end thereof, each of said torsion bars being rotatable in response to selective operation of said motor means, and a link pivotally affixed to each torsion bar at one end thereof and secured at the other end to one of said seat support brackets, said links being individually responsive to rotation of the respective torsion bars for elevating the like end of both said seat support brackets to raise the respective seat end thereof.

2. A seat track as claimed in claim 1 wherein each of said first and second elevating mechanisms comprises independent gear adjacent the motor means driven by a respective shaft of said motor means, means interposed between each of said gear means and the respective torsion bar for rotating said torsion bar in response to selective operation of one of said elevating mechanisms.

3. A seat track as claimed in claim 2, wherein said motor means includes a motor having three armature shafts within a common external casing.

4. A seat track as claimed in claim 3, wherein said external casing comprises a structurally rigid unitary casing, a first platform rigidly securing one end of said rigid casing of motor to one side of said carriage, and a second platform rigidly securing the other end of the rigid casing of said motor means to the other side of said carriage, and in which there are means mounting said first elevating mechanism on said first platform and means securing said second elevating mechanism on said second platform.

5. A mechanism as claimed in claim 4, wherein each of said platforms supports a seat end elevating mechanism adjacent that end of the seat.

6. A power seat track control mechanism for a vehicle comprising a pair of stationary parallel rail members laterally spaced apart, a carriage tracked to said rail members and including track members individually engaging said rail members and constraining said carriage to substantially fore and aft movement, means interfacing between said track and rail members for driving said carriage and a seat borne thereby in said fore and aft movement, drive motor means, a structurally rigid housing on said motor means, a pair of spaced platform members rigidly affixing respective ends of said rigid housing to respective rail members intermediate between said track members, a first and a second power transmission means driven by said motor means, means mounting each of said transmission means on a separate one of said platforms, means responsive to operation of one of said transmission means for elevating the rear end of said seat, means responsive to operation of the other of said transmission means for elevating the front end of said seat, and each of said transmission means secured to one of said platform members adjacent one end of the seat being elevated.

7. A mechanism as claimed in claim 5, wherein there are a front and a rear torsion bar spanning said carriage and engaging the track members thereof.

8. A mechanism as claimed in claim 7, wherein each of said elevating means is responsive to operation of a transmission means to cause rotation of one of said torsion bars.

9. A mechanism as claimed in claim 8, wherein said carriage includes seat support brackets at the respective lateral sides of said carriage, supporting said seat, wherein there are lever means interposed between each torsion bar and each bracket for elevating like ends of both support brackets on rotation of a torsion bar.

10. A power seat track structure for a vehicle comprising two parallel spaced apart rails, a carriage adapted to support a seat thereon with one of said tracks forming each side of said carriage, each of said tracks mounted on and engaging one of said rails, said engagement constraining said carriage to longitudinal movement parallel to said rails, respective front and rear end elevating mechanisms for controlling elevational movement of the respective longitudinal ends of said carriage and seat, individually selectable motor drive means mounted intermediate between said tracks, front output drive means operable by said motor means on a selection thereof for operating a front one of said end elevating mechanisms, rear output drive means operable by said motor means on selection thereof for operating a rear one of said end elevating mechanisms, said output drive means disposed substantially in one plane, inputs to said elevating mechanisms disposed substantially in said one plane, means mounting said front output drive means between said motor means and one track adjacent the front end elevating mechanism, and means for mounting said rear output drive means between said motor means and said other track adjacent the rear end elevating mechanism.

11. A structure as claimed in claim 10, wherein the mounting means for said drive means comprises respective rigid platforms securing said motor means to said respective ones of said tracks in a structurally rigid manner, and in which there are front and rear torsion bars extending between and secured to the two tracks to further solidify said structure.

12. A structure as claimed in claim 11, wherein there are seat support brackets supporting said seat at the lateral ends thereof, and means pivotally supporting said brackets on the respective torsion bars.

* * * * *

UNITED STATES PATENT OFFICE
CERTIFICATE OF CORRECTION

Patent No. 4,015,812          Dated April 5, 1977

Inventor(s) Max O. Heesch

It is certified that error appears in the above-identified patent and that said Letters Patent are hereby corrected as shown below:

Column 7, line 44, Claim 7, line 1, "Claim 5" should read -- Claim 6 -- .

Signed and Sealed this

Fourteenth Day of June 1977

[SEAL]

Attest:

RUTH C. MASON
*Attesting Officer*

C. MARSHALL DANN
*Commissioner of Patents and Trademarks*